(12) United States Patent
Hashiba et al.

(10) Patent No.: US 7,714,468 B2
(45) Date of Patent: May 11, 2010

(54) MAGNETOELECTRIC GENERATOR

(75) Inventors: Mitsuharu Hashiba, Tokyo (JP);
Akifumi Miyake, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 6 days.

(21) Appl. No.: 11/311,398

(22) Filed: Dec. 20, 2005

(65) Prior Publication Data

US 2007/0057582 A1  Mar. 15, 2007

(30) Foreign Application Priority Data

Sep. 12, 2005  (JP) .............................. 2005-264117

(51) Int. Cl.
*H02K 9/00* (2006.01)
(52) U.S. Cl. .......................................... 310/58; 310/59
(58) Field of Classification Search .................. 310/58, 310/59
See application file for complete search history.

(56) References Cited

U.S. PATENT DOCUMENTS

| | | | | |
|---|---|---|---|---|
| 4,918,343 | A * | 4/1990 | Heinrich et al. | 310/58 |
| 5,859,483 | A * | 1/1999 | Kliman et al. | 310/58 |
| 6,114,784 | A * | 9/2000 | Nakano | 310/59 |
| 6,522,036 | B1 * | 2/2003 | Chen | 310/58 |
| 6,570,276 | B1 | 5/2003 | Morel et al. | |
| 6,819,016 | B2 | 11/2004 | Houle et al. | |
| 2002/0105238 | A1 * | 8/2002 | Radomile et al. | 310/61 |
| 2004/0108786 | A1 * | 6/2004 | Niimi et al. | 310/201 |
| 2005/0035673 | A1 | 2/2005 | Lafontaine et al. | |

FOREIGN PATENT DOCUMENTS

| | | |
|---|---|---|
| JP | 59-109237 U | 7/1984 |
| JP | 59-189441 U | 12/1984 |
| JP | 60156240 A * | 8/1985 |
| JP | 60162435 A * | 8/1985 |
| JP | 4-161035 A | 6/1992 |
| JP | 2000-156943 A | 6/2000 |
| JP | 2000-236639 A | 8/2000 |
| JP | 2002-162188 | 6/2002 |
| JP | 2003-164087 | 6/2003 |
| JP | 2004-135382 | 4/2004 |
| JP | 2004-320944 A | 11/2004 |

* cited by examiner

*Primary Examiner*—Quyen Leung
*Assistant Examiner*—Alex W Mok
(74) *Attorney, Agent, or Firm*—Sughrue Mion, PLLC

(57) ABSTRACT

In order to achieve the above object, according to one aspect of the present invention, there is provided a magnetoelectric generator including: a flywheel rotating around an axis of rotation; a plurality of magnets disposed on an inner peripheral surface of the flywheel and rotating together with the flywheel; a stator core disposed radially inside the magnets, the stator core being constituted by stacking a plurality of thin steel sheets and having: an annulus portion; and a plurality of teeth projecting radially outward from the annulus portion; and a generating coil configured by winding conducting wire onto the teeth, wherein: a coolant aperture through which a coolant passes is formed on the annulus portion so as to penetrate through the thin steel sheets in a direction of lamination.

4 Claims, 6 Drawing Sheets

MAGNETOELECTRIC GENERATOR

BACKGROUND OF THE INVENTION

1. Field of the Invention

The present invention relates to a magnetoelectric generator for generating electric power by electromagnetic induction between a magnet and a generating coil due to rotation of a flywheel.

2. Description of the Related Art

Known examples of conventional magnetoelectric generators include magnetoelectric generators in which generating coils are installed on teeth of a stator core in which a plurality of thin steel sheets are laminated in order to suppress heat generated by eddy currents, and a plurality of permanent magnets fixed to an inner surface of an outer peripheral edge of a flywheel so as to be spaced away from each other circumferentially are disposed around an outer periphery of the generating coils (See Patent Literature 1, for example).

Patent Literature

Japanese Patent Laid-Open No. 2004-135382 (Gazette: FIG. 1)

In magnetoelectric generators having the above configuration, heat due to hysteresis loss and eddy current loss is generated in the stator core due to an alternating magnetic field generated by the permanent magnets as the flywheel rotates, increasing temperature in the stator core, and because temperature in the generating coils also increases with temperature increases in the stator core, resistance increases in the generating coils. As a result, temperature in the generating coils also increases due to copper loss, which is proportional to resistance in the generating coils, and one problem has been that generating efficiency is reduced.

An electrically-insulating coating is applied to copper wire used in the generating coils using a polymeric material, and another problem has been that service life and reliability of the generating coils are reduced if the temperature in the generating coils rises and a high-temperature state continues for an extended period of time.

In particular, there has been a tendency toward increased output in magnetoelectric generators In recent years, and frequency has been increased by increasing the number of magnets (magnetic poles), increasing heat generated in the stator core by hysteresis loss and eddy current loss, and also exacerbating the above problems.

SUMMARY OF THE INVENTION

The present invention aims to solve the above problems and an object of the present invention is to provide a magnetoelectric generator enabling generating efficiency to be improved and service life and reliability of a generating coil to be improved by increasing cooling efficiency of a stator core to suppress temperature increases in the generating coil.

In order to achieve the above object, according to one aspect of the present invention, there is provided a magnetoelectric generator including: a flywheel rotating around an axis of rotation; a plurality of magnets disposed on an inner peripheral surface of the flywheel and rotating together with the flywheel; a stator core disposed radially inside the magnets, the stator core being constituted by stacking a plurality of thin steel sheets and having: an annulus portion; and a plurality of teeth projecting radially outward from the annulus portion; and a generating coil configured by winding conducting wire onto the teeth, wherein: a coolant aperture through which a coolant passes is formed on the annulus portion so as to penetrate through the thin steel sheets in a direction of lamination.

In a magnetoelectric generator according to the present invention, because the coolant aperture through which the coolant passes is formed in the annulus portion of the stator core, cooling efficiency of the laminated core itself is improved, suppressing temperature increases in the generating coil, improving generating efficiency, and also improving service life and reliability of the generating coil.

DETAILED DESCRIPTION OF THE PREFERRED EMBODIMENTS

Figure 1:
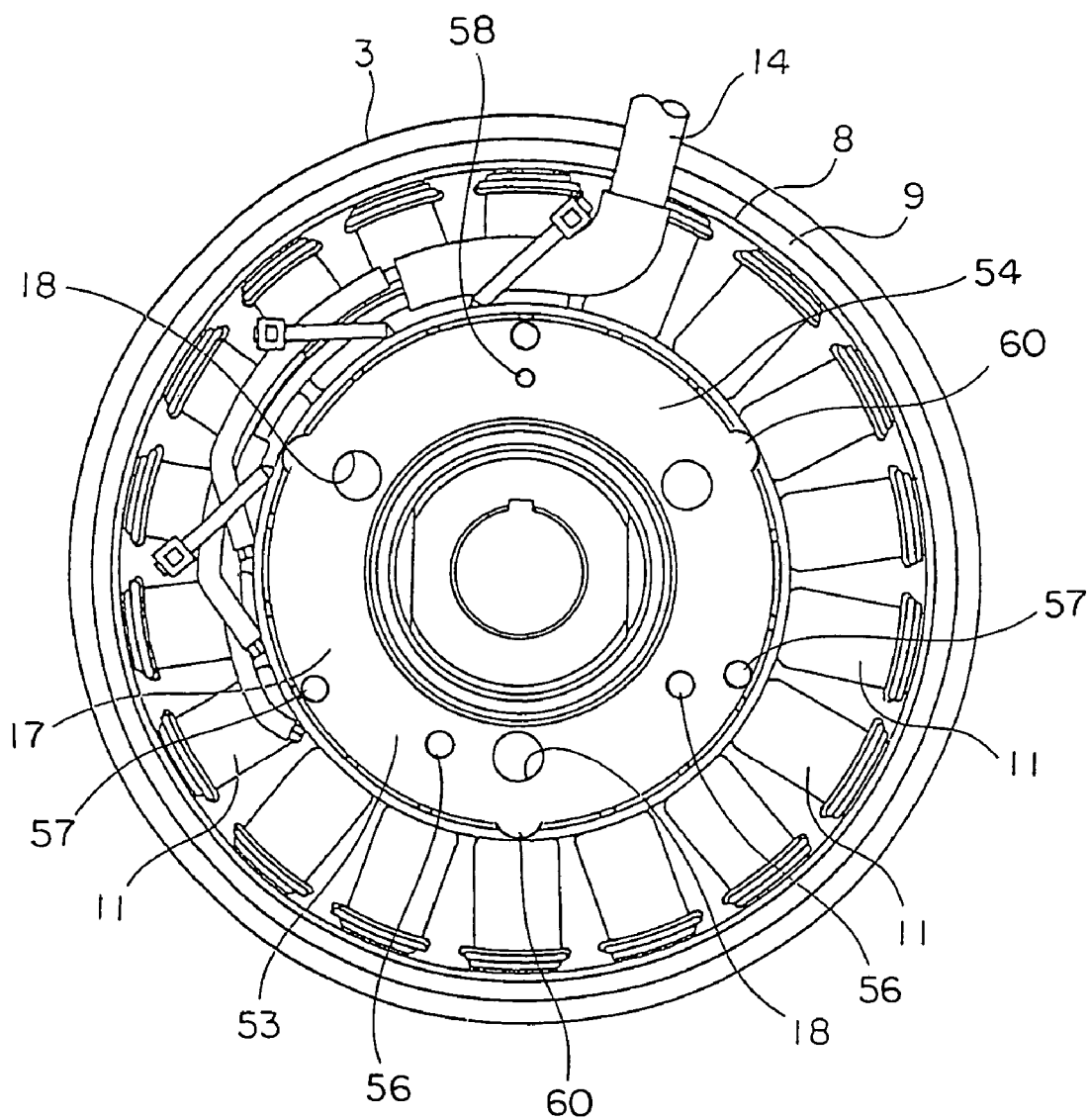
FIG. 1 is a front elevation showing a magnetoelectric generator according to Embodiment 1 of the present invention.

Preferred embodiments of the present invention will now be explained, and identical or corresponding members and portions in the drawings will be given identical numbering.

Embodiment 1

Figure 2:
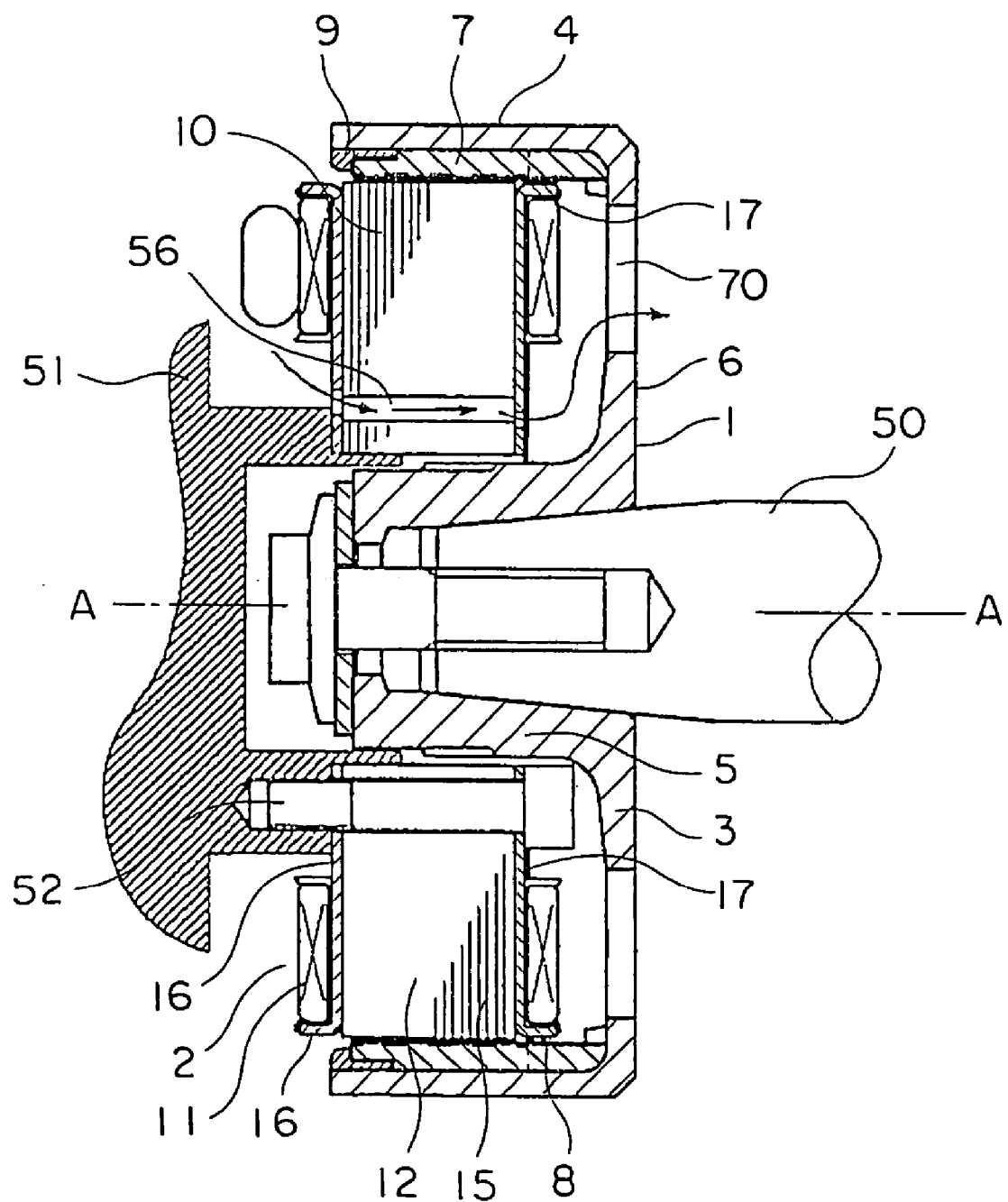
FIG. 2 is a cross section of FIG. 1.

FIG. 1 is a front elevation showing Embodiment 1 of a magnetoelectric generator according to the present invention, and FIG. 2 is a cross section of FIG. 1.

This magnetoelectric generator includes: a rotor 1 linked to an internal combustion engine; and a stator 2 facing the rotor 1 from radially outside.

The rotor 1 includes: a bowl-shaped flywheel 3; and permanent magnets 7 fixed to the flywheel 3. The flywheel 3 includes: an outer peripheral tubular portion 4; a boss portion 5 into which is press-fitted a rotating shaft 50 that is driven to rotate by the internal combustion engine; and a bottom portion 6 connecting the tubular portion 4 and the boss portion 5. A plurality of bottom apertures 70 are formed on the bottom portion 6. The flywheel 3 rotates around an axis of rotation A-A.

The permanent magnets 7 are fixed to an inner peripheral surface of the tubular portion 4 of the flywheel 3 at a uniform angular pitch from each other around the axis of rotation A-A. The plurality of permanent magnets 7 are magnetized such that adjacent permanent magnets 7 have reverse polarity to each other such that a magnetic field that alternately changes in direction is generated in a space at an inner periphery of the permanent magnets 7.

A tubular protective ring 8 is inserted so as to be placed in close contact with inner peripheral surfaces of each of the permanent magnets 7. First and second end portions of each of the permanent magnets 7 in a direction of the axis of rotation A-A and circumferential spaces between each of the permanent magnets 7 are filled with a molded material 9. The plurality of permanent magnets 7 and the protective ring 8 are fixed to the inner peripheral surface of the tubular portion 4 of the flywheel 3 by the molded material 9.

The stator 2 is fixed to the bracket 51 using mounting bolts 52 constituting a fixing member.

Figure 3:
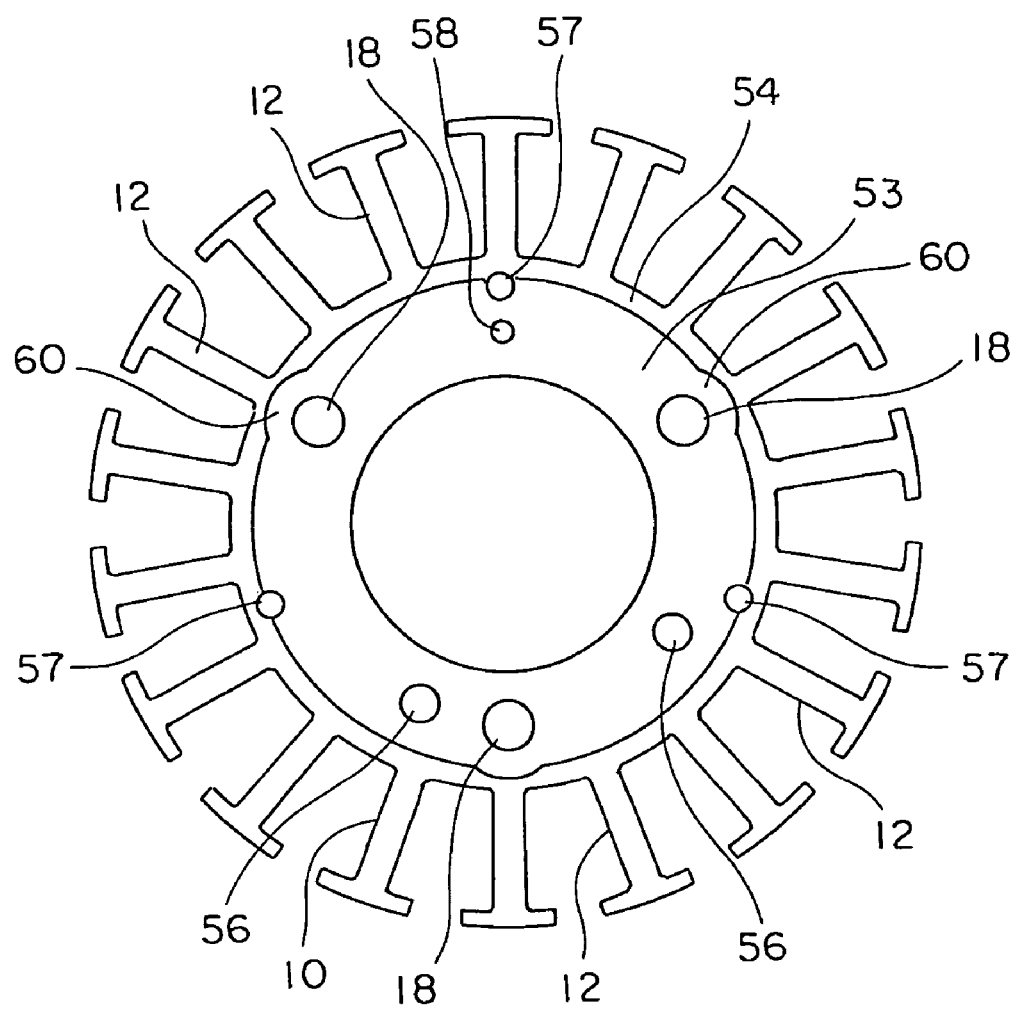
FIG. 3 is a front elevation showing a state in which a first end plate and a second end plate are stacked on first and second surfaces of a laminated core from FIG. 1.

The stator 2 includes: a hollow cylindrical stator core 10; and generating coils 11. The stator core 10 is configured such that its entire surface is covered by an insulating resin film 54, and as shown in FIG. 3, includes: an annulus portion 53; and a plurality of teeth 12 projecting radially outward from the annulus portion 53 at a uniform pitch circumferentially in a radial pattern.

The generating coils 11 are each configured by winding a copper wire constituting a conducting wire onto circumferential side surfaces of the teeth 12. The generating coils 11 are connected to each other by connecting leads 14.

The stator core 10 includes: a laminated core 15 configured by laminating a large number of doughnut-shaped thin magnetic steel sheets (cold-rolled steel sheets of SPCC, etc., for example) constituting cold-rolled steel sheets in a direction of the axis of rotation A-A; and a first end plate 16 and a second end plate 17 respectively stacked in close contact with first and second end surfaces of the laminated core 15.

Outer peripheral edge portions of the first end plate 16 and the second end plate 17 are bent toward the generating coils 11 in order to prevent the generating coils 11 from collapsing radially and to induce magnetic flux in the teeth 12 of the laminated core 15. The first end plate 16 and the second end plate 17 are constituted by an alloy steel material (SUS 304, for example) having a tensile strength approximately twice that of the thin magnetic steel sheets constituting the laminated core 15.

Mounting apertures 18 penetrating through in identical directions parallel to the axis of rotation A-A are formed at three positions at a uniform pitch circumferentially on the annulus portion 53 of the stator core 10. The stator 2 is fixed to the bracket 51 by passing the mounting bolts 52 through the mounting apertures 18 and screwing end portions of the mounting bolts 52 into the bracket 51.

Ventilating apertures 56 penetrating through in identical directions parallel to the axis of rotation A-A and each constituting a coolant aperture having a smaller diameter than that of the mounting apertures 18 are formed at two positions on the annulus portion 53.

In addition, rivet apertures 57 having a smaller diameter than that of the ventilating apertures 56 are formed at three positions at a uniform pitch circumferentially on the annulus portion 53 parallel to the axis of rotation A-A. The laminated core 15 and the first end plate 16 and the second end plate 17 respectively stacked in close contact with the first and second end surfaces of the laminated core 15 are integrated by passing rivets (not shown) through the rivet apertures 57 and fastening the rivets.

A reference aperture 58 having a smaller diameter than that of the rivet apertures 57 is formed on the annulus portion 53 parallel to the axis of rotation A-A. In a winding process in which the generating coils 11 are manufactured by winding the conducting wire onto the teeth 12, a pin is disposed in the reference aperture 58 so as to stand upright, and this reference aperture 58 serves a function in positioning relative to a winding machine.

Thickness of the insulating resin film 54 on a surface at a central portion of the annulus portion 53 near the second end plate is slightly thicker than in a surrounding area. Radially-projecting projecting portions 60 are formed on the insulating resin film 54 outside the mounting apertures 18. The mounting apertures 18 and the side of the stator core 10 from which to insert the mounting bolts 52 can be recognized by the projecting portions 60.

In a magnetoelectric generator having the above configuration, the flywheel 3 rotates interdependently with the rotating shaft 50 that is driven to rotate by the internal combustion engine, and as it does so electric power is generated in the generating coils 11 due to the alternating magnetic field generated by the permanent magnets 7. The resulting alternating-current output is rectified by rectifying diodes (not shown), and is supplied to a load such as a vehicle battery, etc.

With the rotation of the flywheel 3, external air passes mainly through the ventilating apertures 56 and the bottom apertures 70, and flows outside the magnetoelectric generator, as indicated by arrows in FIG. 2.

In a magnetoelectric generator according to this embodiment, because ventilating apertures 56 that pass through in the direction of lamination of the thin steel sheets are formed in the annulus portion 53 as explained above, air passes through the annulus portion 53, suppressing temperature increases in the stator core 10.

Figure 4:
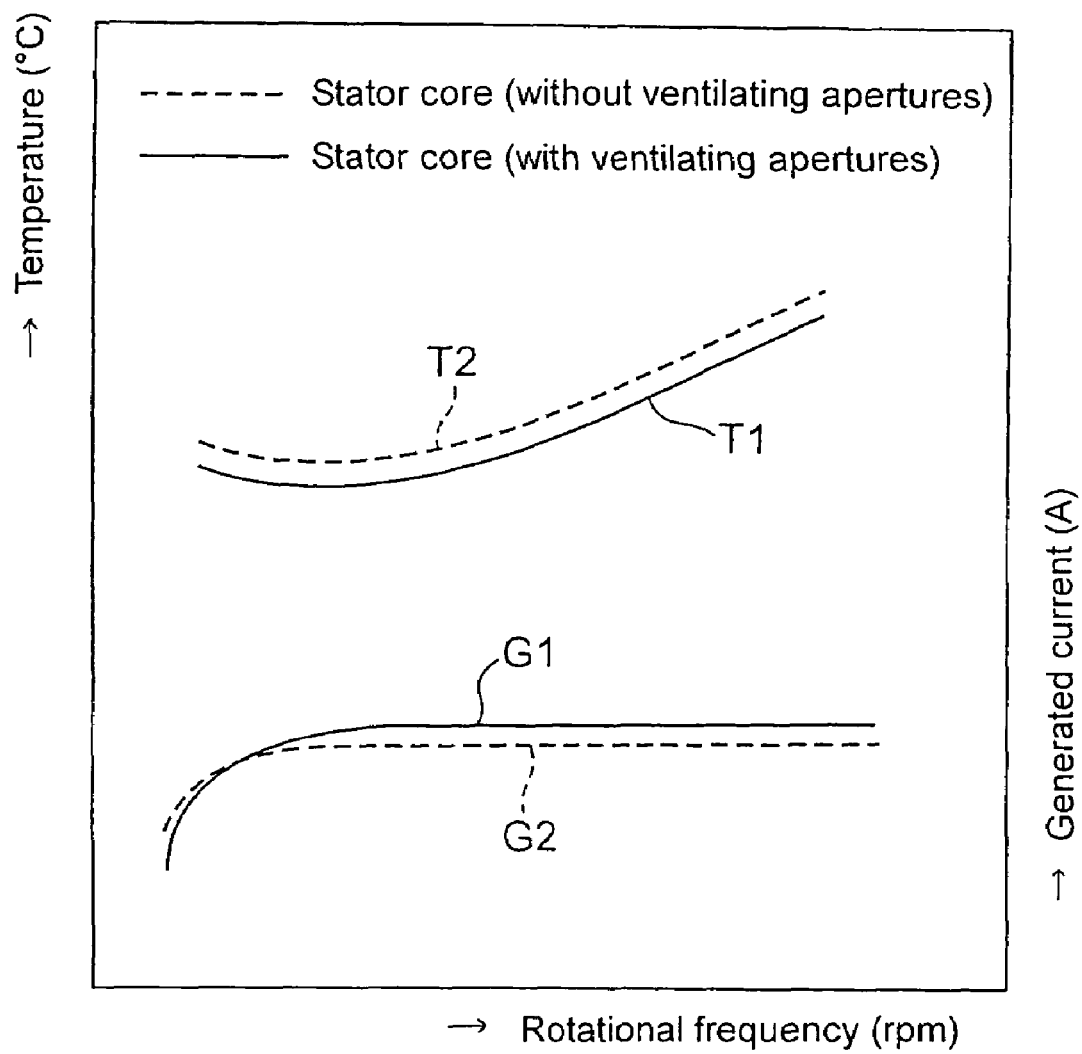
FIG. 4 is a graph showing a stator core temperature characteristic curve and a generating coil output current characteristic curve for the magnetoelectric generator in FIG. 1.

The present inventors have found the influence of temperature in the stator core 10 and output current from the generating coils 11 in the presence and absence of the ventilating apertures 56 in the stator core 10 by conducting experiments. FIG. 4 is a graph showing results of those experiments.

In FIG. 4, the horizontal axis represents driving rotational frequency (rpm) of the magnetoelectric generator, and the vertical axis represents temperature (° C.) in the stator core 10 on the left and output current (A) from the generating coils 11 on the right.

In a stator core 10 in which ventilating apertures 56 are formed, the temperature characteristic curve for the stator core 10 is T1, and the output current characteristic curve for the generating coils 11 is G1.

In a stator core 10 in which ventilating apertures 56 have not been formed, the temperature characteristic curve for the stator core 10 is T2, and the output current characteristic curve for the generating coils 11 is G2.

The generated heat (core loss+copper loss) temperature at each rotational frequency is the saturation temperature, and although there are some changes in absolute values depending on the cooling efficiency of the stator core 10, a clear temperature difference (a temperature reduction due to cooling effects) can be seen that depends on the presence or absence of the ventilating apertures 56 in the stator core 10.

Even though a core region constituting a magnetic field circuit in the stator core 10 is reduced by an amount proportionate to the ventilating apertures 56 formed therein, in other words the generating efficiency is reduced, it can be seen that power generation by the generating coils 11 is increased by reducing temperature increases in the stator core 10.

Because temperature increases in the stator core 10 are suppressed and temperature increases in the generating coils 11 are also suppressed, the influence of heat on the electrically-insulating coating of the coated generating coils 11 can be kept low, improving the service life and reliability of the generating coils 11.

Moreover, by forming the ventilating apertures 56 in the stator core 10, the thin magnetic steel sheets and alloy steel material used are reduced in weight, also providing a cost advantage due to the material recycling rate after press working (increase in scrap volume).

Although the diameter of the reference aperture 58 formed on the annulus portion 53, which contributes to improvements in productivity, is small compared to the ventilating apertures 56, the reference aperture 58 also functions as a coolant aperture in a similar manner to the ventilating apertures 56, contributing to the suppression of temperature increases in the stator core 10.

Because the projecting portions 60 are formed in the vicinity of the mounting apertures 18, the mounting bolts 52 can be prevented from being erroneously inserted into the ventilating apertures 56.

Because the first end plate 16 and the second end plate 17 are constituted by an alloy steel material (SUS 304, for example) having a tensile strength approximately twice that of the thin magnetic steel sheets constituting the laminated core 15, twice the pressure per unit area is possible than if thin magnetic steel sheets were used as the material for the first end plate 16 and the second end plate 17, in other words, area of mounting seats for the mounting bolts 52 can be reduced by half, making it possible to form proportionately more ventilating apertures 56.

Moreover, thin magnetic steel sheets have been used in the laminated core 15, but even if electromagnetic steel sheets having greater tensile strength than the magnetic steel sheets are used, for example, it is still possible to form more ventilating apertures in a similar manner.

Reductions in rigidity of the stator core due to forming a large number of ventilating apertures can be countered by increasing sheet thickness of the thin steel sheets, increasing pressure on the rivets passing through the rivet apertures, as well as changing over to high-strength materials, etc.

Embodiment 2

Figure 5:
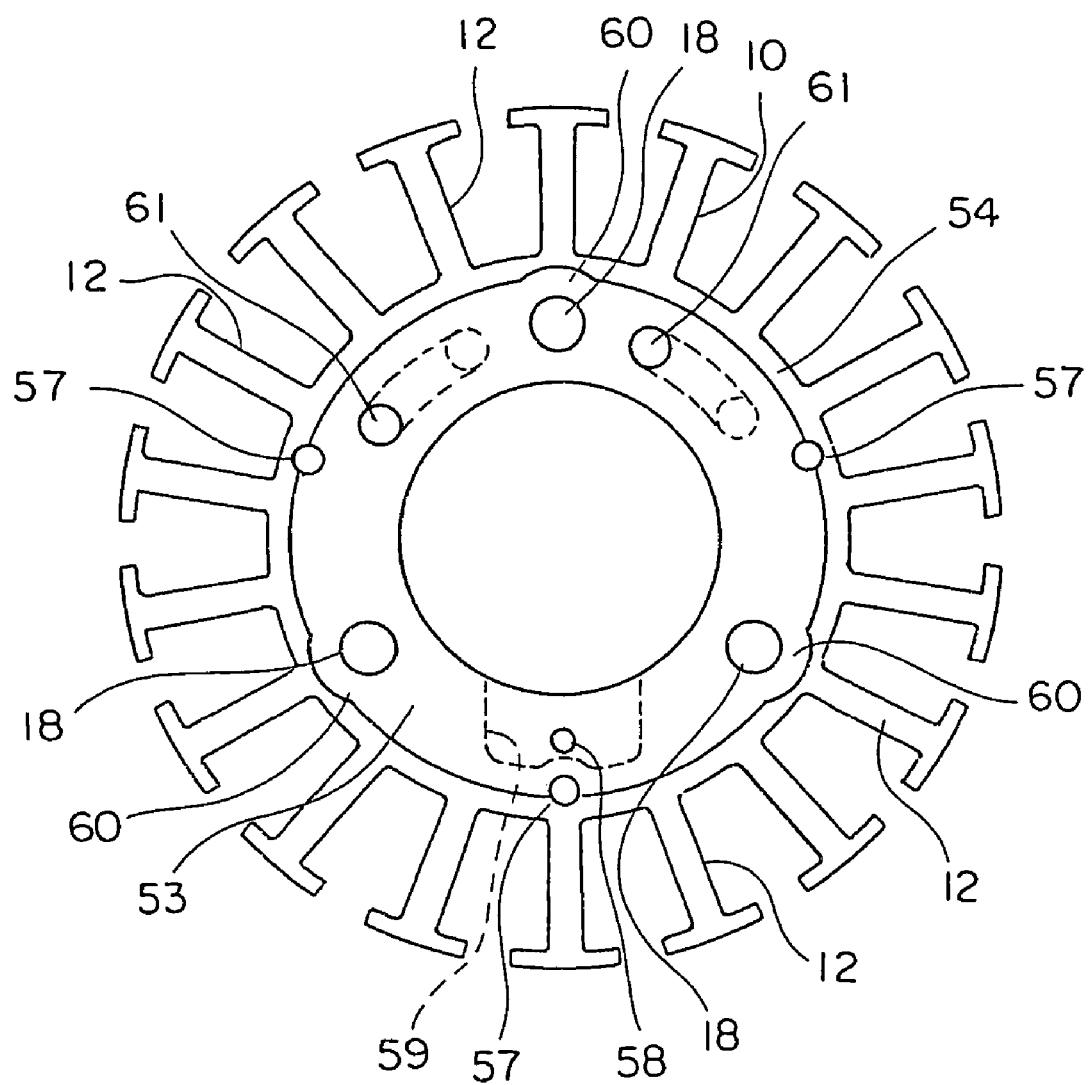
FIG. 5 is a front elevation showing a state in which a first end plate and a second end plate are stacked on first and second surfaces of a laminated core in a magnetoelectric generator according to Embodiment 2.
Figure 6:
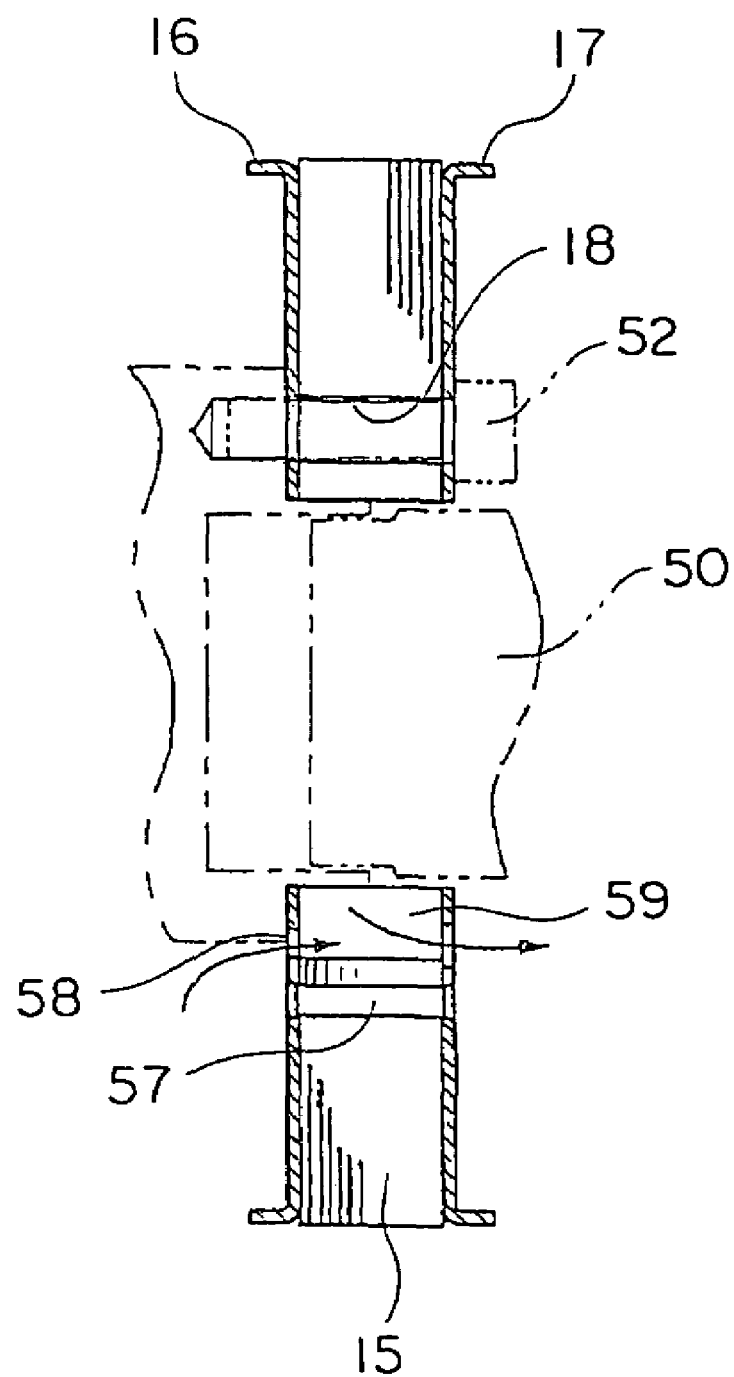
FIG. 6 is a cross section of FIG. 5.

FIG. 5 is a front elevation showing a stator core 10 in Embodiment 2 of a magnetoelectric generator according to the present invention, and FIG. 6 is a cross section of FIG. 5.

In this embodiment, a cavity 59 is formed radially inside the annulus portion 53 near the bracket 51. Ventilating apertures 61 are formed so as to be inclined circumferentially.

The rest of the configuration is similar to that of the magnetoelectric generator according to Embodiment 1.

In this magnetoelectric generator because the cavity 59 is formed radially inside the annulus portion 53 near the bracket 51, air contact surface area is increased in a region of the stator core 10 facing the bracket 51 that is subjected to heat generated by the internal combustion engine and in which ventilation is poor, improving cooling efficiency of the stator core 10 proportionately.

Because the ventilating apertures 61 are formed so as to be inclined circumferentially, air contact surface area in the ventilating apertures 61 is increased compared to that of the ventilating apertures 56 according to Embodiment 1, also improving cooling efficiency of the stator core 10 proportionately.

Moreover, in each of the above embodiments, cases have been explained in which the coolant is air, and the air passes through each of the ventilating apertures 56 or 61 constituting a coolant aperture to cool the stator core 10, but of course the present invention is not limited to this configuration, and the coolant may also be engine oil.

What is claimed is:

1. A magnetoelectric generator comprising:
a flywheel rotating around an axis of rotation;
a plurality of magnets disposed on an inner peripheral surface of said flywheel and rotating together with said flywheel, said flywheel having a throughole for passing a coolant;
a stator core disposed radially inside said magnets, said stator core being constituted by stacking a plurality of thin steel sheets and having:
an annulus portion; and
a plurality of teeth projecting radially outward from said annulus portion; and
a generating coil configured by winding conducting wire onto said teeth, wherein:
a coolant aperture through which only the coolant passes in one direction is formed on said annulus portion so as to penetrate through said thin steel sheets in a direction of lamination.

2. The magnetoelectric generator according to claim 1, wherein:
said coolant aperture is formed so as to extend in a direction parallel to said axis of rotation.

3. A magnetoelectric generator comprising:
a flywheel rotating around an axis of rotation;
a plurality of magnets disposed on an inner peripheral surface of said flywheel and rotating together with said flywheel;
a stator core disposed radially inside said magnets, said stator core being constituted by stacking a plurality of thin steel sheets and having:
an annulus portion; and
a plurality of teeth projecting radially outward from said annulus portion; and
a generating coil configured by winding conducting wire onto said teeth, wherein:
a ventilating aperture through which only an air coolant passes in one direction is formed on said annulus portion so as to penetrate through said thin steel sheets in a direction of lamination wherein:
said ventilating aperture is formed so as to be inclined circumferentially.

4. A magnetoelectric generator comprising:
a flywheel rotating around an axis of rotation;
a plurality of magnets disposed on an inner peripheral surface of said flywheel and rotating together with said flywheel;
a stator core disposed radially inside said magnets, said stator core being constituted by a laminated core of a plurality of thin steel sheets, a first end plate and a second end plate stacked in close contact with first and second end surfaces of the laminated core, respectively, and having:
an annulus portion; and
a plurality of teeth projecting radially outward from said annulus portion; and
a generating coil configured by winding conducting wire onto said teeth, wherein:
a coolant aperture through which only a coolant passes in one direction is formed on said annulus portion so as to penetrate through said thin steel sheets in a direction of lamination, wherein:
said stator core is fixed to a bracket; and
a cavity is formed on a radially-inner side of said annulus portion within said laminated core near said bracket, the first end plate extending radially inward beside said cavity.

* * * * *